United States Patent
Narita et al.

(10) Patent No.: US 8,347,921 B2
(45) Date of Patent: Jan. 8, 2013

(54) PARALLEL TYPE VALVE ASSEMBLY

(75) Inventors: Masaru Narita, Tsukubamirai (JP);
Shinichi Yoshimura, Tsukubamirai (JP);
Takashi Murakami, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 533 days.

(21) Appl. No.: 12/618,128

(22) Filed: Nov. 13, 2009

(65) Prior Publication Data
US 2010/0148101 A1 Jun. 17, 2010

(30) Foreign Application Priority Data
Dec. 17, 2008 (JP) ................................ 2008-321341

(51) Int. Cl.
*F15B 13/06* (2006.01)
*F16K 31/08* (2006.01)

(52) U.S. Cl. ............. 137/884; 137/625.64; 137/625.67; 137/383; 137/271; 251/129.15

(58) Field of Classification Search ............... 137/596.1, 137/596.2, 884, 625.27, 625.67, 383, 625.64, 137/271; 251/129.15
See application file for complete search history.

(56) References Cited

U.S. PATENT DOCUMENTS

| 6,164,335 | A | 12/2000 | Hayashi et al. | |
|---|---|---|---|---|
| 7,021,332 | B2* | 4/2006 | Greenwood et al. | 137/596 |
| 7,048,002 | B2* | 5/2006 | Hayashi et al. | 137/560 |
| 7,118,087 | B2* | 10/2006 | Miyazoe et al. | 251/26 |
| 2001/0003289 | A1* | 6/2001 | Mead et al. | 137/884 |

FOREIGN PATENT DOCUMENTS

| CN | 1268636 A | 10/2000 |
|---|---|---|
| JP | 2004-11858 | 1/2004 |
| JP | 2004-156719 | 6/2004 |

OTHER PUBLICATIONS

Office Action issued on May 13, 2011 in the corresponding Chinese Application No. 200910253748.1 (with English Translation).

* cited by examiner

*Primary Examiner* — Craig Schneider
*Assistant Examiner* — Atif Chaudry
(74) *Attorney, Agent, or Firm* — Oblon, Spivak, McClelland, Maier & Neustadt, L.L.P.

(57) ABSTRACT

Two connected valve units each formed by serially connecting plural electromagnetic valves in a direct abutment state are disposed in parallel between two end blocks. The two end blocks are tightened with plural connecting bolts disposed therebetween so as to directly clamp and fix the two connected valve units from both sides in the serial connection direction of the electromagnetic valves. One of the end blocks is provided with a power supply connector, and the other is provided with an air inlet port and a discharge port.

15 Claims, 7 Drawing Sheets

PARALLEL TYPE VALVE ASSEMBLY

BACKGROUND OF THE INVENTION

1. Field of the Invention

The present invention relates to a parallel type valve assembly having plural electromagnetic valves serially connected in two rows.

2. Description of the Related Art

Generally, the process for installing plural electromagnetic valves on the manifold base and the rail to form a valve assembly has been employed for controlling the fluid pressure equipment such as the air cylinder using those electromagnetic valves. In the aforementioned case, the plural electromagnetic valves are generally arranged in a single row. Preferably, the electromagnetic valves are arranged in two rows for the purpose of efficiently forming the valve assembly using more electromagnetic valves as disclosed in Japanese Unexamined Patent Application Publication Nos. 2004-11858 and 2004-156719.

The valve assembly disclosed in the above documents has plural electromagnetic valves arranged and installed on the single manifold base. The use of the manifold base may unavoidably cause the valve assembly to be large as a whole. The operation for installing the plural electromagnetic valves is complicated as they are individually attached to the manifold base using screws. The number of the electromagnetic valves to be installed on the manifold base is determined in the stage for designing the manifold base. In order to change the number of the electromagnetic valves for the valve assembly, the use of the manifold base with the different structure designed to be adapted to the number of the electromagnetic valves is required.

BRIEF SUMMARY OF THE INVENTION

Accordingly, it is an object of the present invention to easily form a compact parallel type valve assembly having serially-connected plural electromagnetic valves arranged in two rows without using a manifold base.

In order to achieve the object, a valve assembly is formed of two connected valve units each formed by directly abutting plural electromagnetic valves arranged in parallel between two end blocks. The two end blocks are tightened with plural connecting bolts disposed therebetween to directly clamp and fix the two connected valve units from both sides in a serial connection direction of the electromagnetic valves.

The electromagnetic valve includes a valve housing with a first joint surface and a second joint surface on both surfaces for a serial connection, an air inlet hole and a discharge hole which penetrate the valve housing in the serial connection direction, and a valve connector for electric coupling. When the plural electromagnetic valves are serially connected, the air inlet holes and the discharge holes of the respective electromagnetic valves are serially connected to form a collective air inlet flow path and a collective discharge flow path, and the valve connectors of the adjacent electromagnetic valves are electrically coupled with each other.

The end block includes an inner end surface on which two electromagnetic valves at each end of the two connected valve units are brought into abutment, an outer end surface positioned opposite the inner end surface, a front end surface and a rear end surface, and an upper surface and a lower surface. The first end block among the two end blocks includes a power supply connector for supplying power to the electromagnetic valve, a connector substrate for retaining relay connectors, and the two relay connectors disposed alongside on the connector substrate, electrically coupled with the power supply connector, and individually electrically coupled with the two connected valve units. The second end block as at least the other one of the two end blocks includes air inlet ports and discharge ports communicated with the collective air inlet flow paths and the collective discharge flow paths of the connected valve units.

Preferably, each of the first end block and the second end block includes two air inlet ports individually communicated with the collective air inlet flow paths of the two connected valve units. The air inlet ports are open to the outer end surfaces of the respective end blocks. The air inlet ports of the first end block and the second end block communicated through the collective air inlet flow paths are concentrically located. A plug is allowed to seal the air inlet port which is kept unused.

Alternatively, the second end block is allowed to include one air inlet port which is communicated with the collective air inlet flow paths of the two connected valve units via an inner communication hole of the second end block.

According to the present invention, the second end block includes two discharge ports which are individually communicated with the collective discharge flow paths of the two connected valve units. An end portion of the collective discharge flow path at a side of the first end block is sealed with the first end block.

According to the present invention, preferably each of the plural electromagnetic valves has a same structure with respect to the air inlet hole, the discharge hole, the valve connector, and a dimension in the serial connection direction. The first connected valve unit among the two connected valve units has the first joint surface of the electromagnetic valve directed to the first end block, and the second joint surface directed to the second end block. The second connected valve unit has the first joint surface of the electromagnetic valve directed to the second end block, and the second joint surface directed to the first end block. One of the two relay connectors of the first end block is a male type connector, and the other is a female connector.

According to the present invention, each of the first end block and the second end block has a same width and a same height in a longitudinal direction, and includes two connecting portions for connecting one of the first end block and the second end block of another valve assembly that is the same as the valve assembly to the outer end surface, while being in a direct abutment state using a joint fixture. The connecting portion is formed symmetrically about a surface for longitudinally dividing the end block into two parts on the front end surface and the rear end surface of the end blocks at a position closer to the outer end surface, and includes an engagement reception portion to which a half part of the joint fixture is fixed, a nut insertion hole formed in the outer end surface for accommodating a nut for screwing a bolt so as to fix the joint fixture, and a semi-spherical bolt insertion groove formed to connect the engagement reception portion to the nut insertion hole on the outer end surface. Each of the first end block and the second end block has the same structure with respect to the connecting portion.

According to the present invention, a valve assembly connected structure may be formed by connecting a plurality of the valve assemblies each with the aforementioned structure.

According to the present invention, two connected valve units formed of the plural directly-connected electromagnetic valves are arranged in parallel between two end blocks, and those two end blocks are tightened with plural connecting bolts. Those two end blocks directly clamp and fix the two connected valve units from both sides in the connection direction of the electromagnetic valve. This makes it possible to easily form the compact parallel type valve assembly which may easily change the number of the electromagnetic valves.

DETAILED DESCRIPTION OF INVENTION

Figure 1:
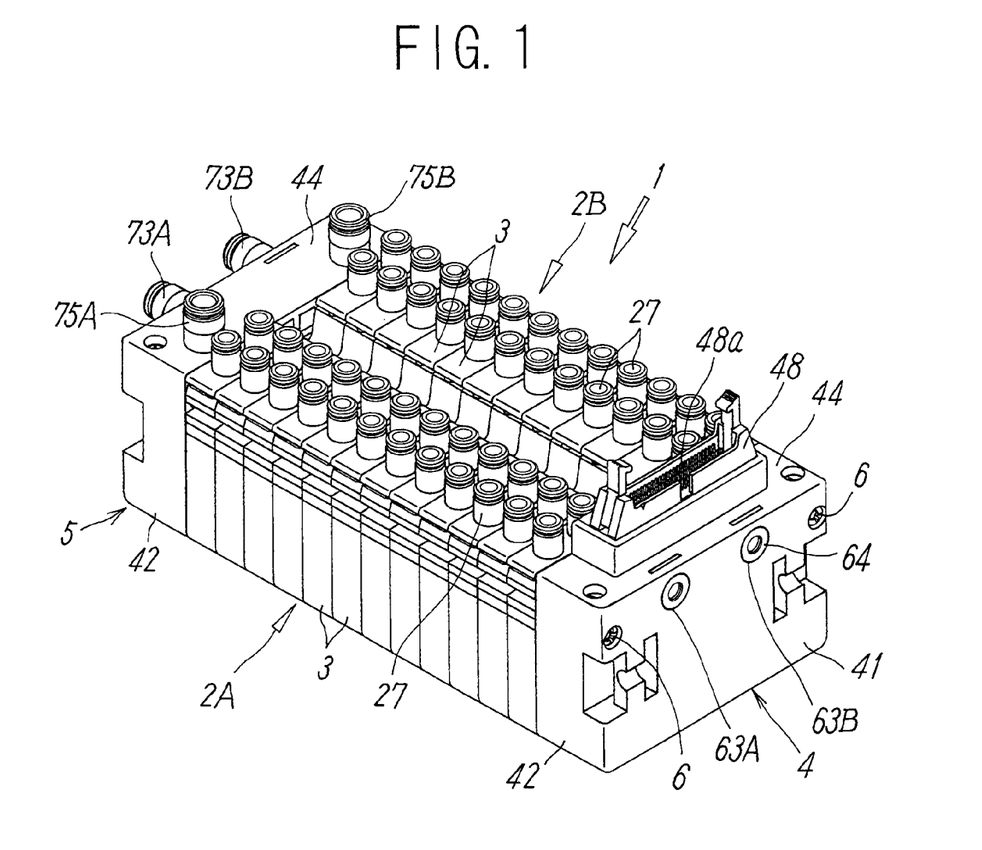
FIG. 1 is a perspective view illustrating an example of a parallel type valve assembly according to the present invention.
Figure 2:
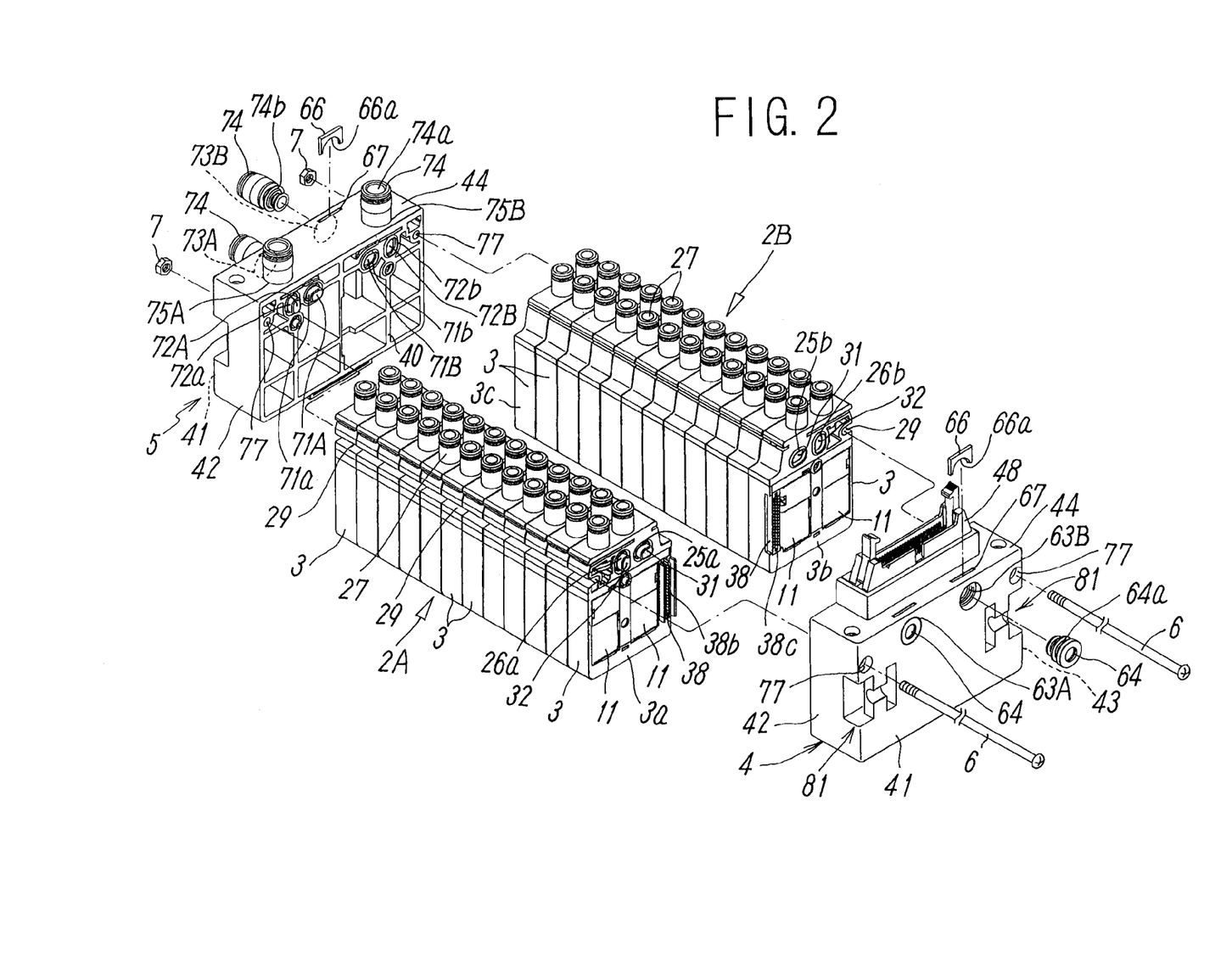
FIG. 2 is an exploded perspective view of the valve assembly shown in FIG. 1.

The drawing shows an embodiment of a parallel type valve assembly 1 according to the present invention. Referring to FIGS. 1 and 2, the valve assembly 1 is formed by arranging two connected valve units 2A and 2B each having plural electromagnetic valves 3 serially connected in a single row in parallel between two end blocks 4 and 5, and tightening those end blocks 4 and 5 with two connecting bolts 6 and nuts 7 disposed at the respective end blocks. The two connected valve units 2A and 2B are directly clamped and fixed by the two end blocks 4 and 5 from both sides in the direction of the connected electromagnetic valves 3.

The electromagnetic valve 3 has both side surfaces serving as a first joint surface 3a and a second joint surface 3b so as to be serially connected. The first joint surface 3a and the second joint surface 3b of the adjacent electromagnetic valves 3 are directly abutted to form the connected valve units 2A and 2B. Referring to FIG. 2, the first connected valve unit 2A has the first joint surface 3a of each of the electromagnetic valves 3 directed to the front side (to the first end block 4). The second connected valve unit 2B has the second joint surface 3b of each of the electromagnetic valves 3 directed to the front side.

Figure 3:
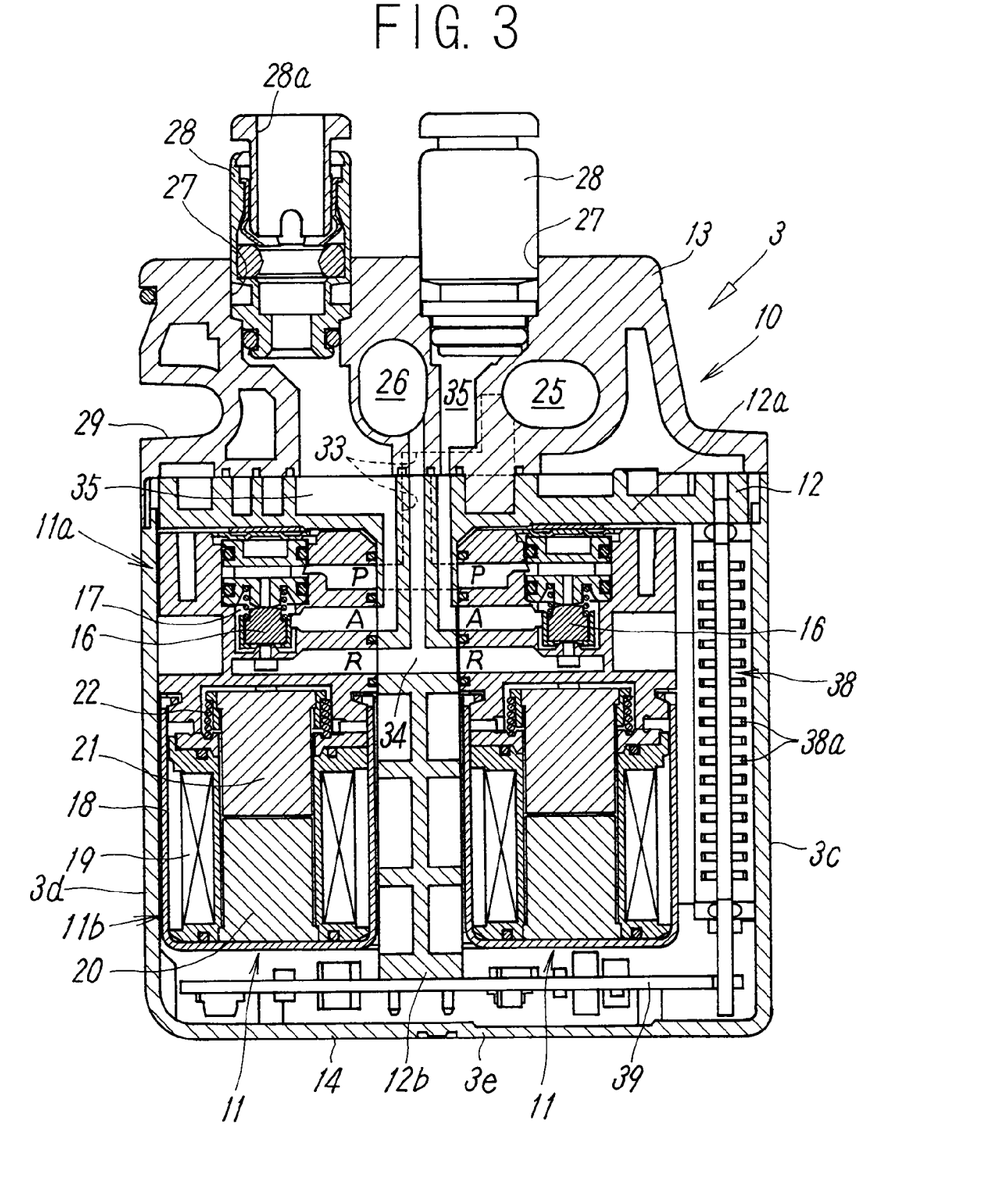
FIG. 3 is a sectional view of an electromagnetic valve 3.

Referring to FIGS. 2 and 3, the electromagnetic valve 3 has two electromagnetically operated three-port valves 11 installed inside a valve housing 10. In the embodiment shown in the drawing, all the electromagnetic valves 3 have the same structures.

The valve housing 10 includes a valve adapter 12 to which the two three-port valves 11 are attached, a port block 13 connected to the valve adapter 12, and a U-like cover member 14 for covering a front end surface 3c, a rear end surface 3d and a lower surface 3e of the electromagnetic valve 3. In the example shown in the drawing, the respective electromagnetic valves 3 are disposed each having the port block 13 directed upward.

The valve adapter 12 has a T-like shape as the side view, and includes a plate-like main body 12a to which the port block 13 is attached, and a partition 12b which extends from the center of the main body 12a downward. The two three-port valves 11 are attached to both sides of the partition 12b symmetrically.

The three-port valve 11 includes a flow path switching portion 11a for switching an air flow path with a valve member 16, and an electromagnetic operation portion 11b for driving the valve member 16 under the electromagnetic force. The flow path switching portion 11a includes a supply opening P, an output opening A, a discharge opening R, a valve chamber 17 communicated with those openings, and the valve member 16 stored in the valve chamber 17. The valve member 16 functions in switching the flow path among the three openings P, A and R.

The electromagnetic operation portion 11b has an exciting coil 19 inside a magnetic frame 18, a fixed iron core 20 for generating an electromagnetic force through application of electricity to the exciting coil 19, a movable iron core 21 having the magnetism adsorbed to the fixed iron core 20 upon application of electricity to the exciting coil 19, and a return spring 22 which returns the movable iron core 21 to a position apart from the fixed iron core 20 when cutting the application of electricity to the exciting coil 19, and allows the movable iron core 21 to drive the valve member 16.

The basic structure of the above-described three-port valve is well known. The example employs the electromagnetic valve 3 with the known structure. Accordingly, further detailed explanation of the three-port valve will be omitted.

The port block 13 includes an air inlet hole 25, a discharge hole 26 which penetrate therethrough in the serial connection direction of the electromagnetic valves 3, and two output ports 27 which open to the top end surface of the port block 13. Pipe joints 28 are attached to the respective output ports 27, to which resilient piping tubes each formed of a synthetic resin material are connected. The pipe joint 28 of simple connection type is connected to be in an anti-loosening state while being inserted into a connection port 28a. The structure is the same as the known one.

The port block 13 has a recess shaped bolt insertion portion 29 through which the connecting bolt 6 is inserted at a side for forming the rear end surface 3c of the electromagnetic valve 3.

The air inlet hole 25 has a laterally long oval shape, and the discharge hole 26 has a longitudinally long oval shape. Those air inlet hole 25 and the discharge hole 26 are formed side-by-side at substantially the same position in the height direction of the electromagnetic valve 3.

Referring to FIG. 2, first openings 25a and 26a of the air inlet hole 25 and the discharge hole 26 at the side of the first joint surface 3a are short tubular shaped, and protrude therefrom. Meanwhile, second openings 25b and 26b of the air inlet hole 25 and the discharge hole 26 at the side of the second joint surface 3b are recess shaped, and provided with O-rings (not shown) each at the inner periphery. When plural electromagnetic valves 3 are serially connected, the short tubular first openings 25a and 26a of the air inlet hole 25 and the discharge hole 26 of the adjacent electromagnetic valves 3 are air-tightly engaged with the recess second openings 25b and 26b. As a result, the air inlet holes 25 and the discharge holes 26 are connected to form a collective air inlet flow path 31 and a collective discharge flow path 32. Air is supplied to/discharged from each of the respective electromagnetic valves 3 via the collective air inlet flow path 31.

Referring to FIG. 3, each of the supply openings P of those two three-port valves 11 is communicated with a common supply communication hole 33 formed in the partition 12b of the valve adapter 12. The supply communication hole 33 is communicated with the air inlet hole 25 via the supply communication hole 33 of the port block 13. Each of the discharge openings R of those two three-port valves 11 is communicated with the discharge hole 26 via a common discharge communication hole 34 formed in the partition portion 12b and the port block 13. Further, each of the output openings A of the two three-port valves 11 is individually communicated with two output communication holes 35 formed in the partition portion 12b and the port block 13, and further communicated with an output port 27 individually via the respective output communication holes 35.

When the three-port valve 11 is controlled to communicate the supply opening P with the output opening A to block the discharge opening R, air is output from the output port 27 communicated with the output opening A of the three-port valve 11. When the supply opening P is blocked to communicate the output opening A with the discharge opening R, air is discharged from a discharge port 75A or 75B of the second end block 5 through the collective discharge flow path 32 formed of the discharge holes 26.

The valve adapter 12 includes a valve connecter 38 and a print wiring substrate 39 for electrical coupling. The valve connector 38 is attached to the front end surface of the electromagnetic valve 3 to vertically extend. The print wiring substrate 39 is disposed at the lower end of the electromagnetic valve 3 across the two three-port valves.

The valve connector 38 includes terminals 38a by the number connectable to all the electromagnetic valves 3 which belong to the connected valve unit 2A or 2B. The aforementioned terminals of any one of the valve units are partially connected to the electromagnetic valve 3 with the valve connector 38 via the print wiring substrate 39. The valve connector 38 includes a protruding male side connector portion 38b at the side of the first joint surface 3a of the electromagnetic valve 3 formed to protrude therefrom, and a recess shaped female side connector portion 38c formed at the side of the second joint surface 3b. When the plural electromagnetic valves 3 are serially connected, the male side connector portion 38b and the female side connector portion 38c of the valve connectors 38 of the adjacent electromagnetic valves 3 are plug-in connected. In the aforementioned way, all the electromagnetic valves 3 are electrically coupled in series, thus transmitting the power signal and the operation signal to the respective electromagnetic valves 3 collectively via the valve connectors 38.

Assuming that the serial connection direction of the electromagnetic valves 3 is defined as the lateral direction, the two connected valve units 2A and 2B are oppositely disposed with respect to the lateral direction. The first connected valve unit 2A has each first joint surface 3a of the electromagnetic valves 3 directed to the first end block 4, and has each second joint surface 3b directed to the second end block 5. The other second connected valve unit 2B has each first joint surface 3a of the electromagnetic valves 3 directed to the second end block 5, and has each second joint surface 3b directed to the first end block 4.

The first connected valve unit 2A has the short tubular shaped first openings 25a and 26a of the air inlet hole 25 and the discharge hole 26, and the male side connector portion 38b of the valve connector 38 at the position corresponding to an end portion of the first end block 4, and further has recess shaped second openings 25b and 26b of the air inlet hole 25 and the discharge hole 26, and the female side connector portion 38c of the valve connector 38 at the position corresponding to an end portion of the second end block 5. The second connected valve unit 2B has the recess shaped second openings 25b and 26b of the air inlet hole 25 and the discharge hole 26 at the position corresponding to the end portion of the first end block 4, and the short tubular shaped first openings 25a and 26a of the air inlet hole 25 and the discharge hole 26, and the male side connector portion 38b of the valve connector 38 at the position corresponding to the end portion of the second end block 5.

The two connected valve units 2A and 2B are adjacently disposed while being at a small interval therebetween, and having the respective front end surfaces 3c of the electromagnetic valves 3 oppositely directed.

Figure 4:
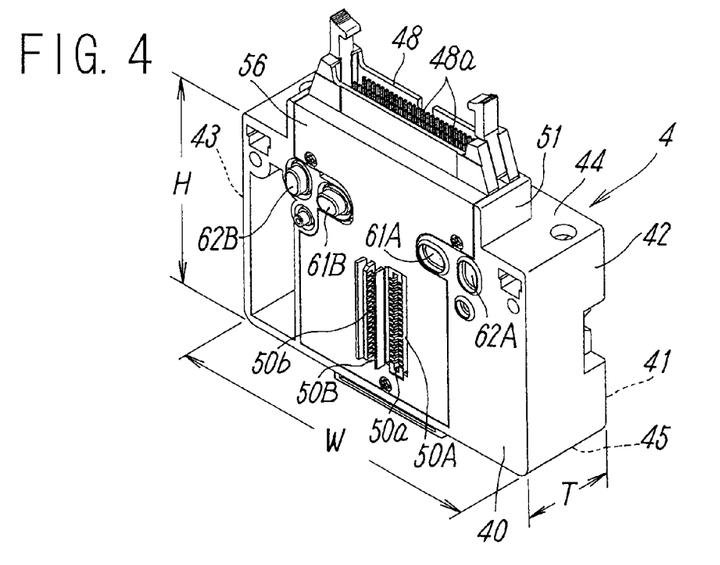
FIG. 4 is a perspective view of a first end block.
Figure 5:
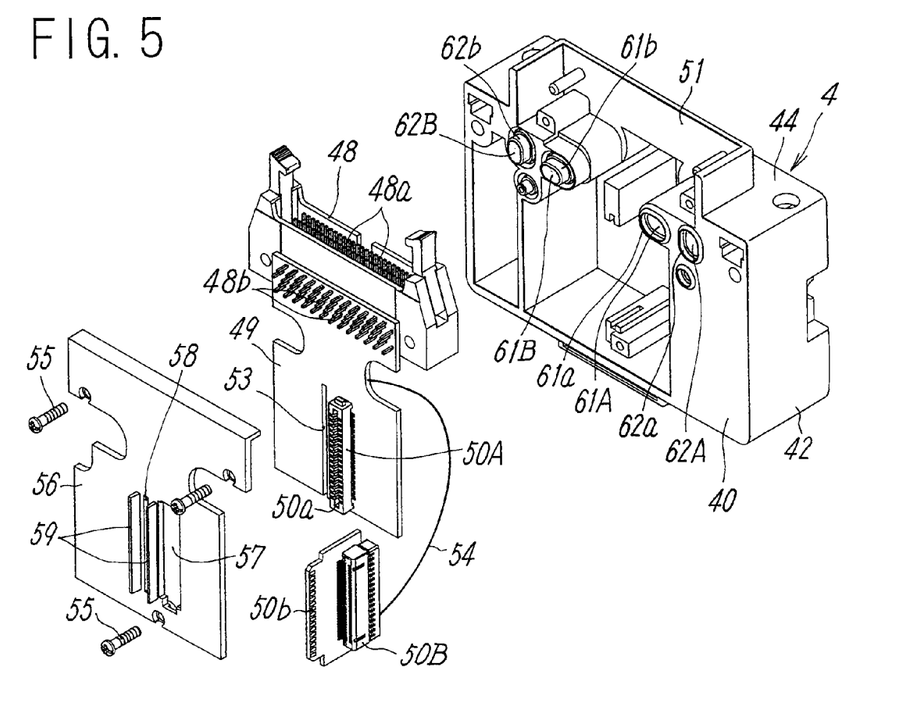
FIG. 5 is an exploded perspective view of the first end block shown in FIG. 4.

As FIGS. 2, 4 and 5 clearly show, each of the two end blocks 4 and 5 is rectangular-box-shaped which has an inner end surface 40 on which the two electromagnetic valves 3, 3 at the respective ends of the two connected valve units 2A and 2B are brought into abutment, an outer end surface 41 opposite the inner end surface 40, a front end surface 42, a rear end surface 43, an upper surface 44, and a lower surface 45. Each of the end blocks 4 and 5 has the size exactly fit within the region of the inner end surface 40 so as not to allow the two electromagnetic valves 3, 3 to deviate outside. Each of the two end blocks 4 and 5 has substantially the same size.

However, each of the two end blocks 4 and 5 does not have to have the same size exactly. The thickness T defined by the inner end surface 40 and the outer end surface 41 may be different from each other so long as they have at least the same width values W in the longitudinal direction and the same height values H.

Among the two end blocks 4 and 5, the first end block 4 serves as a power supply block, and the second end block 5 serves as the air supply/discharge block.

The first end block 4 includes one power supply connector 48, a connector substrate 49 attached to the inner end surface 40 of the first end block 4, and two relay connectors 50A and 50B attached to the connector substrate 49 side-by-side as shown in FIGS. 4 and 5.

The power supply connector 48 supplies power/operation signals to all the electromagnetic valves 3 of the two connected valve units 2A and 2B. The power supply connector 48 includes power supply terminals 48a by the number connectable to all the electromagnetic valves 3.

The power supply connector 48 is installed inside a connector attachment 51 on the upper surface 44 of the first end block 4, having all sides except the inner end surface 40 enclosed with the wall while having the power supply terminals 48a directed upward so as to be connected to the connector at the leading end of the power feed line extending from the control unit installed at another location from above.

The connector substrate 49 has a size sufficient to partially cover two electromagnetic valves 3, 3 at the end portions of the two connected valve units 2A and 2B, and has the top end portion attached to the side surface of the power supply connector 48 so as to be electrically coupled with the power supply terminals 48a via plural connection terminals 48b extending from the power supply connector 48. Two relay connectors 50A and 50B are attached in parallel to the lower portion of the connector substrate 49 around the center while being longitudinally directed.

Among the two relay connectors 50A and 50B, the first relay connector 50A, which is located at the side of the first connected valve unit 2A is a female type connector with a recess shaped connector portion 50a. The second relay connector 50B located at the side of the second connected valve unit 2B is a male type connector with a plate-like insertion portion 50b. The first relay connector 50A is connected to the male type connector 38b of the valve connector 38 of the electromagnetic valve 3, which is located at the end of the first connected valve unit 2A. The second relay connector 50B is connected to the female connector portion 38c of the valve connector 38 of the electromagnetic valve 3, which is located at the end of the second connected valve unit 2B.

The first relay connector 50A is fixed to the connector substrate 49, and electrically coupled with the power supply connector 48 via the wiring printed on the connector substrate 49. The second relay connector 50B is attached to the connector substrate 49, and electrically coupled with the power supply connector 48 via a lead wire 54 while having the insertion portion 50b fit inside an attachment groove 53 upwardly extending from the lower end of the connector substrate 49.

A substrate cover 56 for covering the connector substrate 49 is attached to the inner end surface 40 of the first end block 4 with plural screws 55. The substrate cover 56 partially covers the side surface of the power supply connector 48, and fully covers the connector substrate 49. An opening 57 for exposing the first relay connector 50A is formed in the cover at the position corresponding to the first relay connector 50A, and a long hole 58 is formed in the cover for allowing protrusion of the insertion portion 50b at the position corresponding to the second relay connector 50B. Protection walls 59 each with the height substantially the same as the protruding length of the insertion portion 50b are formed on both sides of the long hole 58. The protection walls 59 prevent the insertion portion 50b from being in contact with the foreign substance.

The first end block 4 includes two air inlet holes 61A and 61B individually connected to the collective air inlet flow paths 31 of the two connected valve units 2A and 2B, and two discharge holes 62A and 62B individually connected to the collective discharge flow paths 32. Those holes are located at the same positions horizontally with respect to the height direction of the first end block 4. The air inlet holes 61A and 61B penetrate the first end block 4 to open to the outer end surface 41. The resultant opening forms air inlet ports 63A and 63B. The air inlet ports 63A and 63B are sealed with a detachable plug 64 when they are not used. The discharge holes 62A and 62B do not penetrate the first end block 4, and the respective hole ends are closed inside the first end block 4.

Among those two air inlet holes 61A and 61B, and two discharge holes 62A and 62B, the air inlet hole 61A and the discharge hole 62A connected to the collective air inlet flow path 31 and the collective discharge flow path 32 of the first connected valve unit 2A include recess shaped openings 61a and 62a, each having an O-ring (not shown) attached to the inner periphery. The short tubular shaped first openings 25a and 26a at the ends of the collective air inlet flow path 31 and the collective discharge flow path 32 of the first connected valve unit 2A are fit and connected to insides of the openings 61a and 62a, respectively. The air inlet hole 61B and the discharge hole 62B connected to the collective air inlet flow path 31 and the collective discharge flow path 32 of the second connected valve unit 2B include short tubular shaped openings 61b and 62b, and protrude from the inner end surface 40 of the first end block 4. The openings 61b and 62b are fit and connected to insides of the recess shaped second openings 25b and 26b at the ends of the collective air inlet flow path 31 and the collective discharge flow path 32 of the second connected valve unit 2B.

A thin and long fixture insertion hole 67 for allowing insertion of an engagement fixture 66 is formed in the upper surface 44 of the first end block 4 so as to attach the air inlet ports 63A and 63B to the plug 64 as shown in FIG. 2. A curved engagement edge 66a of the engagement fixture 66 inserted into the fixture insertion hole 67 is engaged with an engagement groove 64a at an outer periphery of the plug 64 so as to be attached in an anti-loosening state. The plug 64 may be detached by removing the engagement fixture 66 from the fixture insertion hole 67, thus making the air inlet ports 63A and 63B available.

As FIG. 2 clearly shows, the second end block 5 includes two air inlet holes 71A and 71B individually connected to the collective air inlet flow paths 31 of the two connected valve units 2A and 2B, and two discharge holes 72A and 72B individually connected to the collective discharge flow paths 32. Those holes are located at the same positions horizontally with respect to the height direction of the second end block 5. The air inlet holes 71A and 71B penetrate the second end block 5 to open to the outer end surface 41. The resultant openings form the air inlet ports 73A and 73B to which a pipe joint 74 is attached. The discharge holes 72A and 72B are individually communicated with the two discharge ports 75A and 75B formed in the upper surface 44 of the second end block 5. The pipe joint 74 is also attached to the discharge ports 75A and 75B.

Among those two air inlet holes 71A and 71B and two discharge holes 72A and 72B, the air inlet hole 71A and the discharge hole 72A connected to the collective air inlet flow path 31 and the collective discharge flow path 32 of the first connected valve unit 2A include short tubular openings 71a and 72a. The openings 71a and 72a are fit and connected to the insides of the recess shaped second openings 25b and 26b at the ends of the collective air inlet flow path 31 and the collective discharge flow path 32 of the first connected valve unit 2A. The air inlet hole 71B and the discharge hole 72B connected to the collective air inlet flow path 31 and the collective discharge flow path 32 of the second connected valve unit 2B include recess shaped openings 71b and 72b, which have O-rings (not shown) each attached to the inner periphery. The short tubular shaped first openings 25a and 26a at the ends of the collective air inlet flow path 31 and the collective discharge flow path 32 of the second connected valve unit 2B are fit and connected to the insides of the openings 71b and 72b.

The pipe joint 74 of simple connection type allows a tube to be inserted into a joint port 74a so as to be connected into the anti-loosening state. The aforementioned structure is the same as the known structure.

The pipe joint 74 is attached to the air inlet ports 73A and 73B, and the discharge ports 75A and 75B by engaging the engagement fixture 66 with the fixture insertion hole 67 such that the curved engagement edge 66a of the engagement fixture 66 is fixed to an engagement groove 74b at the outer periphery of the pipe joint 74 likewise the process for attaching the plug 64 to the air inlet ports 63A and 63B of the first end block 4.

The two connecting bolts 6 are inserted from bolt insertion holes 77 formed in the first end block 4 at the positions close to the front end surface 42 and the rear end surface 43 to the bolt insertion holes 77 of the second end block 5 through the bolt insertion portions 29 formed in the electromagnetic valves 3 of the connected valve units 2A and 2B. The nuts 7 are screwed on the top ends of the respective connecting bolts 6. Those two connecting bolts 6 are tightened to form the parallel type valve assembly 1 as shown in FIG. 1.

In the above-structured valve assembly 1, power supply to the respective electromagnetic valves 3 of the two connected valve units 2A and 2B is performed by the single power supply connector 48 attached to the first end block 4.

Air is supplied to/discharged from the respective electromagnetic valves 3 of the two connected valve units 2A and 2B separately via the two air inlet ports 73A and 73B and two discharge ports 75A and 75B which are formed in the second end block 5. In other words, air is supplied to/discharged from the electromagnetic valves 3 of the first connected valve unit 2A via the air inlet port 73A and the discharge port 75A of the second end block 5. Meanwhile, air is supplied to/discharged from the electromagnetic valves of the second connected valve unit 2B via the other air inlet port 73B and the other discharge port 75B of the second end block 5.

The two air inlet ports 73A and 73B of the second end block 5 are sealed with the plugs, and the two air inlet ports 63A and 63B of the first end block 4 are connected to a piping tube via the pipe joint so as to supply air from the first end block 4. Alternatively, air is supplied to the first connected valve unit 2A from the air inlet port 63A of the first end block 4, and air is supplied to the second connected valve unit 2B from the air inlet port 73B of the second end block 5. In this way, air may be separately supplied to the two connected valve units 2A and 2B from the two end blocks 4 and 5, respectively.

The two air inlet ports 63A and 63B of the first end block 4, and the corresponding two air inlet ports 73A and 73B of the second end block 5, in other words, the air inlet ports 63A and 73A communicated through the collective air inlet flow path 31 of the first connected valve unit 2A, and the air inlet ports 63B and 73B communicated through the collective air inlet flow path 31 of the second connected valve unit 2B are concentrically located, respectively. In the case where the plural valve assemblies 1 are connected to form the valve assembly connected structure to be described later, the air inlet ports 63A and 73A, and 63B and 73B of the adjacent valve assemblies 1 may be mutually communicated using a connecting hush 80 (see FIG. 7).

The use of the two end blocks 4 and 5 allows formation of the parallel type valve assembly 1 having plural electromagnetic valves 3 arranged in two rows without using the manifold base which has been indispensable for the generally employed process. As the manifold base is not used, the resultant parallel type valve assembly 1 may be formed into the compact structure, thus allowing increase/decrease in the number of the electromagnetic valves 3 to be used. In such a case, each number of the electromagnetic valves 3 of the two connected valve units 2A and 2B has to be the same.

Figure 6:
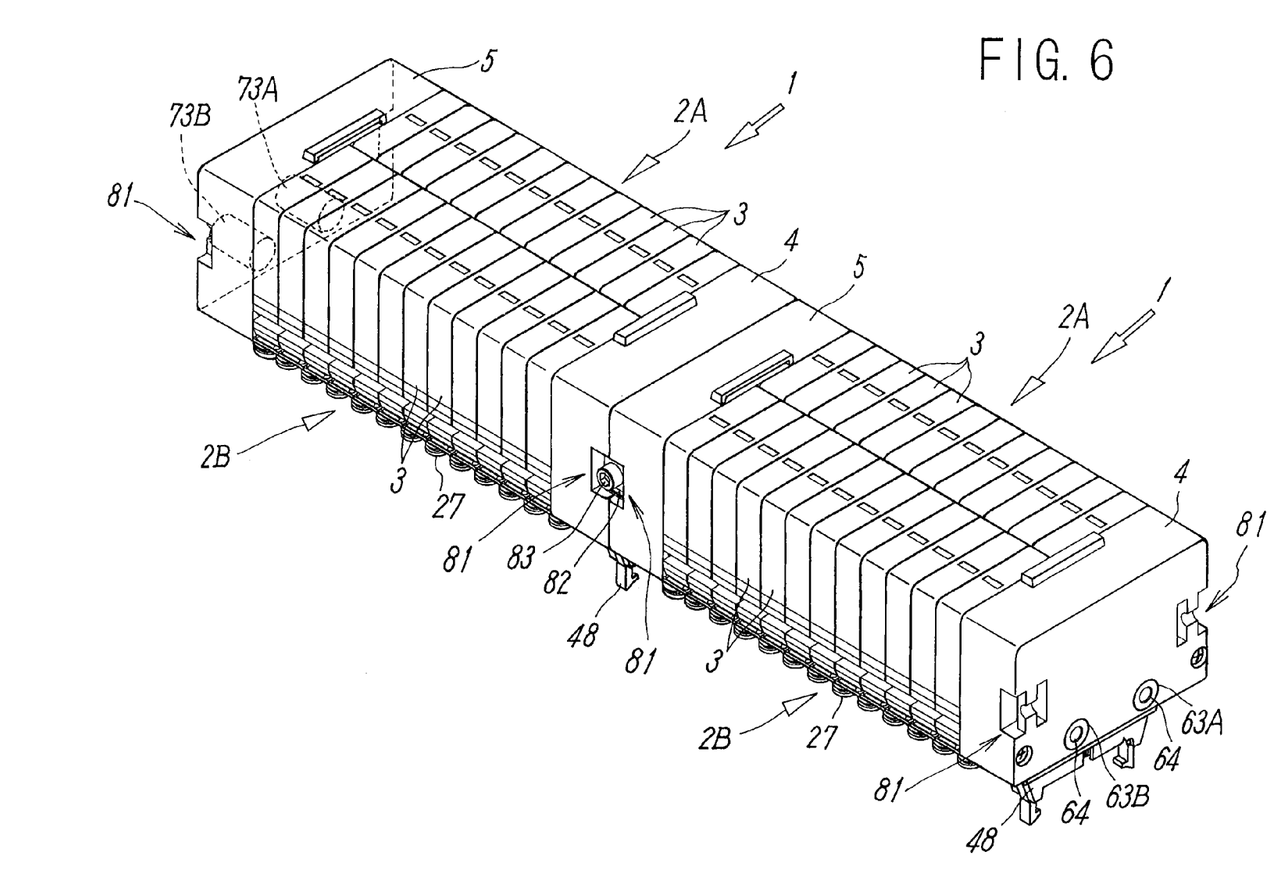
FIG. 6 is a perspective view of a valve assembly connected structure formed by connecting plural valve assemblies shown in FIG. 1 when seen from the lower surface side.

The above-structured valve assembly 1 may be connected to another valve assembly 1 with the same structure as shown in FIG. 6. Each of the first end block 4 and the second end block 5 of the valve assembly 1 has two connecting portions 81, respectively.

Figure 7:
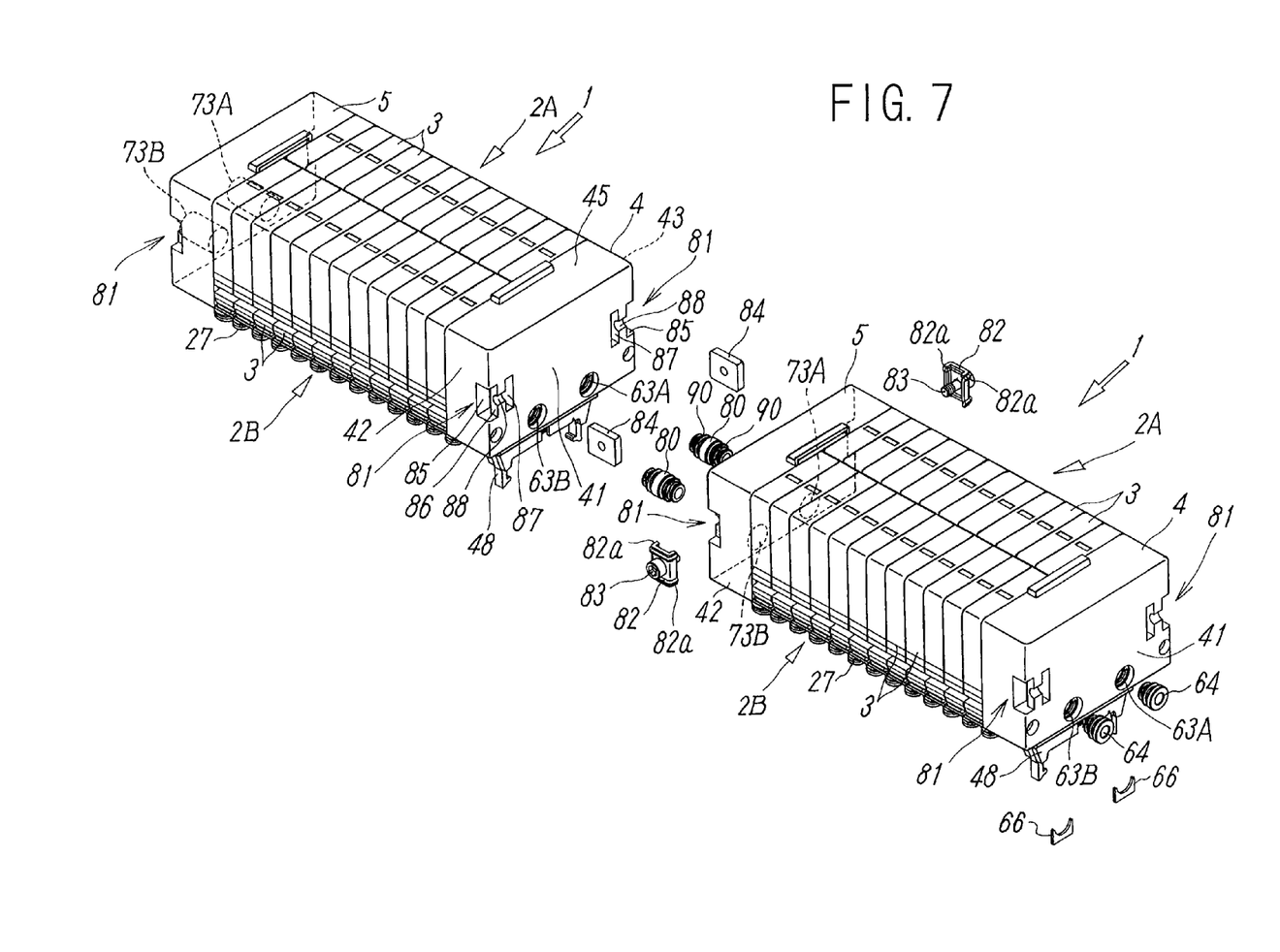
FIG. 7 is an exploded perspective view of the valve assembly connected structure shown in FIG. 6.
Figure 8:
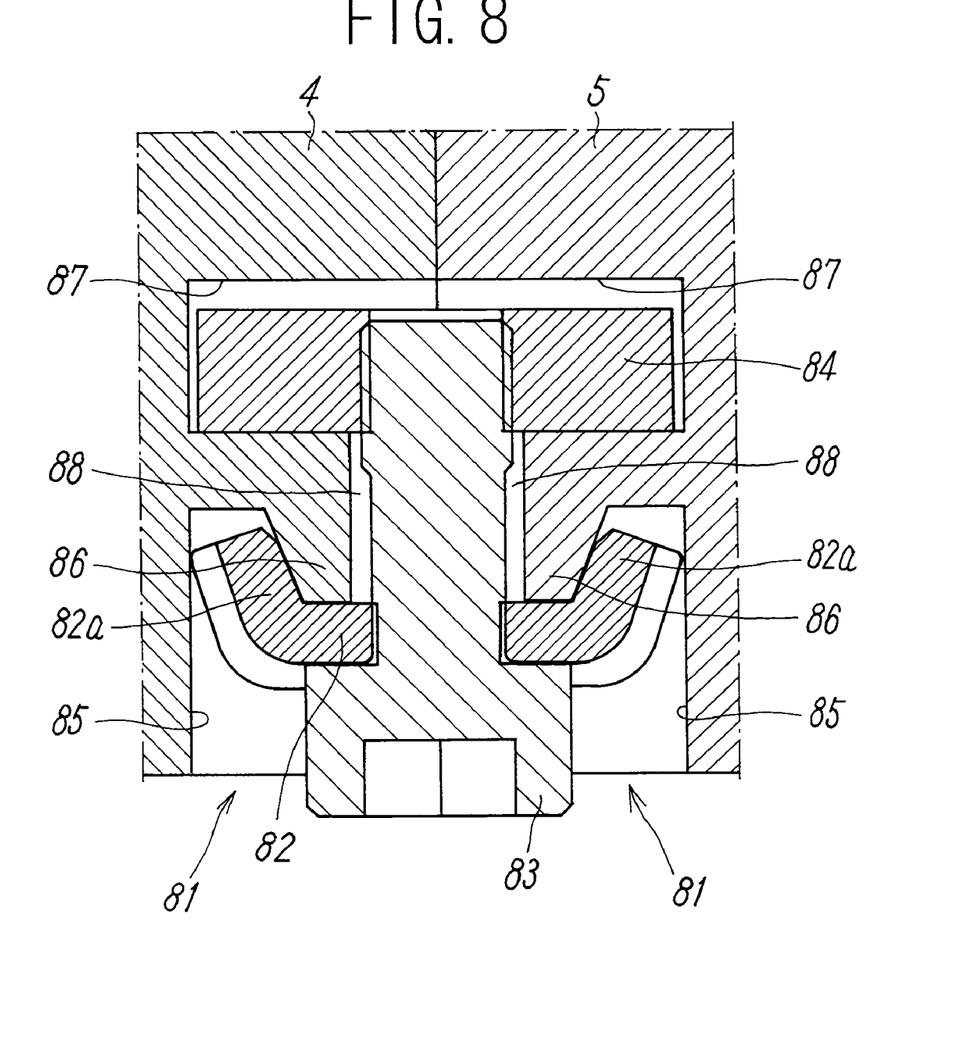
FIG. 8 is an enlarged sectional view of an essential portion shown in FIG. 6.

As FIGS. 7 and 8 clearly show, the connecting portion 81 is formed to connect the end blocks 4 and 5 while having each outer end surface 41 of the end blocks 4 and 5 of the adjacent valve assemblies 1 directly abutted on each other using a joint fixture 82 which has the groove-like cross section, and engagement portions 82a at both ends, a bolt 83, and a nut 84. The specific structure will be described as below.

Recess portions 85 with which half parts of the joint fixtures 82 are fit and engagement reception portions 86 with which the engagement portions 82a of the joint fixtures 82 are engaged are formed in the front end surface 42 and the rear end surface 43 of the end blocks 4 and 5 at the positions close to the outer end surface 41. The outer end surface 41 has nut engagement holes 87 each with the depth with which the half part of the nut 84 is fit, and a semi-spherical bolt insertion groove 88 for connecting the nut engagement hole 87 to one of the recess portion 85 and the engagement reception portion 86 formed therein.

The connecting portion 81 is formed to be symmetrical about the surface for dividing each of the end blocks 4 and 5 into a front part and a rear part. The first end block 4 has the same structure as that of the second end block 5 with respect to the connecting portion 81.

The adjacent valve assemblies 1 are connected by abutting the first end block 4 and the second end block 5 using the short tubular shaped connecting bush 80 to which the O-rings 90 are attached at both ends for communicating the air inlet ports 63A and 63B of the first end block 4 with the air inlet ports 73A and 73B of the second end block 5, respectively as shown in FIG. 7. One half part and the other half part of the connecting bush 80 are air tightly engaged with the air inlet ports 63A and 63B, and 73A and 73B such that the outer end surfaces 41 of the end blocks 4 and 5 are abutted while engaging the respective half parts of the nuts 84 with the nut engagement holes 87 of the first end block 4 and the second end block 5. Then the connecting portions 81 of the end blocks 4 and 5 are brought into an abutment state.

The joint fixture 82 is stored in the recess portion 85 of the connecting portion 81, and the left and right engagement portions 82a of the joint fixture 82 are fixed to the engagement reception portions 86 of the end blocks 4 and 5, respectively. As a result, the bolt 83 is screwed by the nut 84 so as to be tightened. Then the adjacent valve assemblies 1 are connected with each other using the joint fixtures 82. Likewise the required numbers of the valve assemblies 1 are serially connected to form the valve assembly connected structure.

In the thus formed valve assembly connected structure, power is applied to the respective electromagnetic valves 3 individually through the power supply connector 48 for each of the valve assemblies 1.

Air is supplied to the respective electromagnetic valves 3 collectively from the air inlet ports 73A and 73B of the second end block 5 of the valve assembly 1 at the end of the row through the continuous collective air inlet flow path 31 for each of the connected valve units 2A and 2B. In the aforementioned case, the air inlet ports 63A and 63B of the first end block 4 of the valve assembly 1 at the other end of the row are sealed with the plugs 64. Air is discharged from the respective electromagnetic valves 3 individually through the discharge ports 75A and 75B of the second end block 5 for each of the connected valve units 2A and 2B of the respective valve assemblies 1.

The first end block 4 and the second end block 5 may be brought into abutment to connect the valve assemblies 1. Besides, the first end blocks 4 or the second end blocks 5 may be brought into abutment to connect the valve assemblies 1.

In the example as shown in the drawing, two air inlet ports 63A, 63B and 73A, 73B are provided on the two end blocks 4 and 5 at both ends of the valve assembly 1. One air inlet port may be provided for the end blocks 4 and 5, respectively. In the aforementioned case, those air inlet ports are communicated with the collective air inlet flow path 31 of the two connected valve units 2A and 2B via the inner branch holes of the end blocks 4 and 5 so as to supply air to the two connected valve units 2A and 2B from the single air inlet port.

Alternatively, two air inlet ports or one air inlet port may be provided only for the second end block 5 for supplying/discharging air. In the aforementioned case, the single air inlet port may be provided on the upper surface 44 of the second end block 5.

Instead of providing the two discharge ports 75A and 75B for the second end block 5, the single discharge port may be communicated with the collective discharge flow paths 32 of the two connected valve units 2A and 2B through the inner branch hole of the second end block 5 such that air is discharged from the single discharge port to the two connected valve units 2A and 2B. One or two discharge ports may be provided for the first end block 4.

Each size of the two end blocks 4 and 5 does not have to be set to the value which allows abutment of the two electromagnetic valves 3 of the two connected valve units 2A and 2B in the region of the inner end surface 40 so as not to deviate therefrom. Each size of the end blocks may be arbitrarily set so long as the two electromagnetic valves 3 are at least partially covered.

The electromagnetic valve 3 may be formed not only of the two three-port valves 11 as shown in the drawing, but also of the single three-port valve or the single five-port valve.

Each of the plural electromagnetic valves 3 does not have to have the same structure exactly. The one with the structure shown in FIG. 3, the single three-port valve or the single five-port valve may be combined. The electromagnetic valves are required to have the same structures with respect at least to the air inlet hole 25, the discharge hole 26, the valve connector 38, and the dimension in the serial connection direction so as to form the connected valve units 2A and 2B each with the same length.

The invention claimed is:

1. A parallel type valve assembly having two connected valve units each formed by directly abutting respective joint surfaces of side surfaces of plural electromagnetic valves and serially connecting the electromagnetic valves in a row, the two connected valve units arranged in parallel to each other between two end blocks, the two end blocks being tightened with plural connecting bolts disposed therebetween to directly clamp and fix the two connected valve units from both sides in a serial connection direction of the electromagnetic valves, wherein:
the electromagnetic valve includes a valve housing having a first joint surface and a second joint surface on both side surfaces for a serial connection, an air inlet hole and a discharge hole which penetrate the valve housing in the serial connection direction, and a valve connector for electric coupling, when the plural electromagnetic valves are serially connected, the air inlet holes and the discharge holes of the respective electromagnetic valves are serially connected to form a collective air inlet flow path and a collective discharge flow path, and the valve connectors of the adjacent electromagnetic valves are electrically coupled with each other;
the two end blocks include an inner end surface having a size required for straddling the joint surfaces of the two electromagnetic valves positioned so as to face each other at each end of the two connected valve units, an outer end surface positioned opposite the inner end surface, a front end surface and a rear end surface, and an upper surface and a lower surface, the inner end surface of respective end blocks straddles and abuts the joint surfaces of the two electromagnetic valves at the end of the two connected valve units, a first end block among the two end blocks includes a power supply connector for supplying power to the electromagnetic valve, a connector substrate for retaining relay connectors, and two relay connectors disposed alongside on the connector substrate, electrically coupled with the power supply connector, and individually electrically coupled with the two connected valve units, and second end block as at least the other one of the two end blocks includes air inlet ports and discharge ports communicated with the collective air inlet flow paths and the collective discharge flow paths of the connected valve units.

2. The valve assembly according to claim 1, wherein: each of the first end block and the second end block includes two air inlet ports individually communicated with the collective air inlet flow paths of the two connected valve units; the air inlet ports are open to the outer end surfaces of the respective end blocks; the air inlet ports of the first end block and the second end block communicated through the collective air inlet flow paths are concentrically located; and a plug is allowed to seal the air inlet port which is kept unused.

3. The valve assembly according to claim 2, wherein: the second end block includes two discharge ports which are individually communicated with the collective discharge flow paths of the two connected valve units; and an end portion of the collective discharge flow path at a side of the first end block is sealed with the first end block.

4. The valve assembly according to claim 2, wherein: each of the plural electromagnetic valves has a same structure with respect to the air inlet hole, the discharge hole, the valve connector, and a dimension in the serial connection direction; the first connected valve unit among the two connected valve units has the first joint surface of the electromagnetic valve directed to the first end block, and the second joint surface directed to the second end block; the second connected valve unit has the first joint surface of the electromagnetic valve directed to the second end block, and the second joint surface directed to the first end block; and one of the two relay connectors of the first end block is a male type connector, and the other is a female connector.

5. The valve assembly according to claim 4, wherein: each of the first end block and the second end block has a same width and a same height in a longitudinal direction, and includes two connecting portions for connecting one of the first end block and the second end block of another valve assembly that is the same as the valve assembly to the outer end surface, while being in a direct abutment state using a joint fixture; the connecting portion is formed symmetrically about a surface for longitudinally dividing the end block into two parts on the front end surface and the rear end surface of the end blocks at a position closer to the outer end surface, and includes an engagement reception portion to which a half part of the joint fixture is fixed, a nut insertion hole formed in the outer end surface for accommodating a nut for screwing a bolt so as to fix the joint fixture, and a semi-spherical bolt insertion groove formed to connect the engagement reception portion to the nut insertion hole on the outer end surface; and each of the first end block and the second end block has the same structure with respect to the connecting portion.

6. A valve assembly connected structure formed by connecting a plurality of the valve assemblies according to claim 5.

7. The valve assembly according to claim 2, wherein: each of the first end block and the second end block has a same width and a same height in a longitudinal direction, and includes two connecting portions for connecting one of the first end block and the second end block of another valve assembly that is the same as the valve assembly to the outer end surface, while being in a direct abutment state using a joint fixture; the connecting portion is formed symmetrically about a surface for longitudinally dividing the end block into two parts on the front end surface and the rear end surface of the end blocks at a position closer to the outer end surface, and includes an engagement reception portion to which a half part of the joint fixture is fixed, a nut insertion hole formed in the outer end surface for accommodating a nut for screwing a bolt so as to fix the joint fixture, and a semi-spherical bolt insertion groove formed to connect the engagement reception portion to the nut insertion hole on the outer end surface; and each of the first end block and the second end block has the same structure with respect to the connecting portion.

8. A valve assembly connected structure formed by connecting a plurality of the valve assemblies according to claim 7.

9. The valve assembly according to claim 1, wherein: the second end block includes two discharge ports which are individually communicated with the collective discharge flow paths of the two connected valve units; and an end portion of the collective discharge flow path at a side of the first end block is sealed with the first end block.

10. The valve assembly according to claim 1, wherein the second end block includes one air inlet port which is communicated with the collective air inlet flow paths of the two connected valve units via an inner communication hole of the second end block.

11. The valve assembly according to claim 1, wherein: each of the plural electromagnetic valves has a same structure with respect to the air inlet hole, the discharge hole, the valve connector, and a dimension in the serial connection direction; the first connected valve unit among the two connected valve units has the first joint surface of the electromagnetic valve directed to the first end block, and the second joint surface directed to the second end block; the second connected valve unit has the first joint surface of the electromagnetic valve directed to the second end block, and the second joint surface directed to the first end block; and one of the two relay connectors of the first end block is a male type connector, and the other is a female connector.

12. The valve assembly according to claim 11, wherein: each of the first end block and the second end block has a same width and a same height in a longitudinal direction, and includes two connecting portions for connecting one of the first end block and the second end block of another valve assembly that is the same as the valve assembly to the outer end surface, while being in a direct abutment state using a joint fixture; the connecting portion is formed symmetrically about a surface for longitudinally dividing the end block into two parts on the front end surface and the rear end surface of the end blocks at a position closer to the outer end surface, and includes an engagement reception portion to which a half part of the joint fixture is fixed, a nut insertion hole formed in the outer end surface for accommodating a nut for screwing a bolt so as to fix the joint fixture, and a semi-spherical bolt insertion groove formed to connect the engagement reception portion to the nut insertion hole on the outer end surface; and each of the first end block and the second end block has the same structure with respect to the connecting portion.

13. A valve assembly connected structure formed by connecting a plurality of the valve assemblies according to claim 12.

14. The valve assembly according to claim 1, wherein: each of the first end block and the second end block has a same width and a same height in a longitudinal direction, and includes two connecting portions for connecting one of the first end block and the second end block of another valve assembly that is the same as the valve assembly to the outer end surface, while being in a direct abutment state using a joint fixture; the connecting portion is formed symmetrically about a surface for longitudinally dividing the end block into two parts on the front end surface and the rear end surface of the end blocks at a position closer to the outer end surface, and includes an engagement reception portion to which a half part of the joint fixture is fixed, a nut insertion hole formed in the outer end surface for accommodating a nut for screwing a bolt so as to fix the joint fixture, and a semi-spherical bolt insertion groove formed to connect the engagement reception portion to the nut insertion hole on the outer end surface; and each of the first end block and the second end block has the same structure with respect to the connecting portion.

15. A valve assembly connected structure formed by connecting a plurality of the valve assemblies according to claim 14.

* * * * *